Patented July 11, 1939

2,165,828

UNITED STATES PATENT OFFICE 2,165,828

BASE, OR EMULSIFYING VEHICLE, FOR FLAVORING AGENTS

Hugh E. Allen, Evanston, Ill., assignor of one-half to Albert G. McCaleb, Evanston, Ill.

No Drawing. Application October 1, 1937, Serial No. 166,857

8 Claims. (Cl. 99—140)

My invention contemplates and provides an improved base, or emulsifying vehicle, for a practically limitless number of natural and synthetic flavoring agents such as: essential oils of all kinds; extractions of fruits and vegetables, both natural and concentrated; natural vanilla bean and pepper extractions; extractions of fenugreek and lovage; vanillin; coumarin; oleoresins of peppers; butterscotch; diacetyl; etc.

The general object of the invention is to provide an improved base, or emulsifying vehicle, which when intermixed or commingled with flavoring agents will imprison, maintain and preserve their initial characteristic tastes, odors and bouquets far more completely and satisfactorily than will any of the vegetable gums, alcohols and other solvents which, in practices of the prior art, have been utilized to minimize loss, enfeeblement and deterioration (due to volatilization or other changes, either chemical or physical) of the initial, true and desirable characteristic tastes, odors and bouquets of such flavoring agents.

Another object of the invention is to provide such an improved base, or emulsifying vehicle, which, being edible, healthful and easily assimilable by animal organisms, is especially suitable for introduction into food flavoring agents.

Other features, objects and advantages of my present invention will be discussed, or otherwise be made apparent and available to persons skilled in the treatment of flavoring agents, as this specification progresses.

The novel flavoring base, or emulsifying vehicle, of the present invention comprises one or more grain flours, (e. g., soya, barley, corn, oat or wheat flour), commingled with, and subjected to the digestive action of, proteolytic enzymes (e. g., the enzymes of papain derived from the partially ripe fruit or leaves of the tropical papaw tree).

The hydrolized or digested proteins, resultant from the commingling of the enzymes with the selected flour or flours, when properly emulsified with a selected flavoring agent, prevent volatilization of such agent, and maintain, without enfeeblement, its initial characteristic and desirable taste, odor or bouquet indefinitely, so long as the emulsion, which is an exceptionally stable one, is not broken.

A satisfactory base, or emulsifying vehicle, wherewith to realize the objectives of the present invention may be obtained by commingling any one of the aforementioned flours with a quantity of papain having a weight equal to from one-half of one per cent (½ of 1%) to ten per cent (10%) of the weight of the flour. However, in compounding a base, or emulsifying vehicle, which, all things considered, is best suited for incorporation into any given flavoring agent, it often will be found that it is most desirable to commingle two or more of such flours with an appropriate quantity of papain. Thus, for example, a base, or emulsifying vehicle, admirably suited for incorporation into many flavoring agents, may consist of fifty per cent (50%) soya flour and fifty per cent (50%) of any one of the other flours, thoroughly mixed and commingled with a quantity of papain equal in weight to from one-half of one per cent (½ of 1%) to ten per cent (10%) of the aggregate weight of the flours.

Another base, or emulsifying vehicle, suitable for introduction into many flavoring agents, may consist of fifty per cent (50%) oat flour and fifty per cent (50%) of any one of the other flours, thoroughly mixed and commingled with a quantity of papain equal in weight to from one-half of one per cent (½ of 1%) to ten per cent (10%) of the aggregate weight of the flours.

Another very satisfactory base, or emulsifying vehicle, consists of three parts of soya flour and twenty-five parts of oat flour thoroughly intermixed and commingled with a quantity of papain having a weight equal to from one-half of one per cent (½ of 1%) to ten per cent (10%) (usually about two per cent) of the aggregate weight of the flours. Ordinarily I prefer to have this soya-oat type of base, or emulsifying vehicle, comprise a major quantity of oat flour and a minor quantity of soya flour. However, I may use a soya-oat type of emulsifying vehicle which comprises either equal parts of soya flour and oat flour, or even more parts of soya flour than it does of oat flour.

I prefer to add the papain, in its dry state, to the flour or flours in its or their dry state, effect thorough commingling of the papain with the flour or flours in a power driven mixer, and keep the resultant product in a dry state until introduced into the flavoring agent which it is intended to emulsify. Proteolysis of the flour or flours commences immediately upon the commingling of the papain with the flour or flours. The resultant base, or emulsifying vehicle, is ready for use within thirty minutes or less after the flour or flours and the papain have been commingled.

The novel base or emulsifying vehicle of the present invention may be used with surprisingly excellent results to imprison, maintain and preserve the initial characteristic tastes and odors or bouquets of extremely delicate and volatile flavoring agents such as diacetyl. Diacetyl, which ordinarily will very quickly decompose (i. e., develop a disagreeable taste and emit a disagreeable odor) at room temperatures, will not undergo any taste or odor affecting changes, either at room temperature or ordinary higher temperatures, when emulsified with the base or emulsifying vehicle of the present invention. One of the soya flour-oat flour varieties of the emulsifying vehicle usually will afford most excellent results when used with diacetyl. However, others of my enzyme-hydrolized flours may be used in the treatment of diacetyl. In the treatment of diacetyl, when using the hereinbefore described emulsifying vehicle which comprises three parts of soya flour to twenty-five parts of oat flour, I usually add to each one pound of diacetyl (a) one pound of the emulsifying vehicle, and (b) enough water or glycerin, or both, to make a gallon,—and violently agitate the diacetyl, the water and/or glycerin, and the emulsifying vehicle to a perfect emulsion.

One of the important commercial uses of the emulsifying vehicle of the present invention is to intermix it with butter, i. e., butter as churned or with added diacetyl. Ordinary creamery butter, or the same plus added diacetyl, will keep fresh and sweet for long periods, at room temperature or even higher temperatures, when it includes, as an added ingredient, the emulsifying vehicle of the present invention. The emulsifying vehicle functions equally well with both fresh cream butter and the more usual sour cream butter.

Essential oils of all kinds, such, for examples, as those of mace, nutmeg, marjoram, orange, lemon and lime, usually deteriorate very rapidly, when appearing in water or other liquids, with consequent disastrous results to their initial characteristic tastes,—this being true even when such an essential oil and the water or other liquid are whipped into an emulsion with the aid of one or more of the emulsifying vegetable gums heretofore usually employed. The essential oils of the citrous fruits are especially apt very quickly to suffer serious modifications of their initial tastes, when appearing in water or other liquid, regardless of any hitherto known emulsion in which they appear with the water or other liquid. When the enzyme-hydrolized flours of the present invention are utilized to emulsify any of such essential oils with water or other liquid, it will be found that such essential oil will retain its original freshness, original taste and original odor or bouquet, almost indefinitely, without enfeeblement due to volatilization, as long as the emulsion remains unbroken.

Generally speaking, the amount of my enzyme-hydrolized flour base to be employed for the proper emulsification (with water or other liquid) of any essential oil, or other flavoring agent, will depend upon several factors, viz., (a) the nature of the liquid with which the emulsion is to be effected, (b) the deterioration tendencies of the particular flavoring agent to be emulsified, and (c) whether a thin, semiplastic, or plastic emulsified product is desired. The proper amount of my improved emulsifying vehicle to use in any given instance readily may be determined by a very few experimental trials.

Any, or any combination, of my enzyme-hydrolized flours may be added, with gratifying results, as a taste and odor or bouquet imprisoning and preserving vehicle, to extractions of natural fruit, extractions of vanilla beans, fresh fruit juices and concentrated fresh fruit juices,—regardless of whether or not such extractions and fresh juices have had water added thereto. In these cases it usually suffices to use only enough of one of my enzyme-hydrolized flour bases to develop a very slight cloud in the extraction or juices, although greater quantities of the base may be employed if it is desired that the resultant product be semi liquid, semi plastic, or plastic. The delicate esters which so pleasingly characterize very fresh fruit juices, and which ordinarily very quickly depart from the juices after the latter are expelled from the fruits of their origin, are very definitely imprisoned, retained and preserved when the fresh juices are given the benefit of either a mere "cloud," or a greater quantity of added enzyme-hydrolized flours.

Oleoresin of capsicum, oleoresin of white pepper, and oleoresin of black pepper usually contain heavy gummy substances which are very difficult to incorporate into a perfect emulsion when hitherto known emulsifying agents are employed. The enzyme-hydrolized flours of the present invention, when employed as emulsifiers of such oleoresinous flavoring agents, have the power to break down and completely emulsify the aforesaid heavy gummy substances without any hurtful modification, loss or enfeeblement of the characteristic tastes and odors or bouquets of such oleoresinous flavoring agents.

Crystalline flavoring agents, such as vanillin and coumarin, are extraordinarily potent and pleasing when emulsified with enzyme-hydrolized flours as contemplated by the present invention. The enzyme digested flour proteins apparently have the faculty of breaking down the crystals into a perfect emulsion without any impairment of the characteristic taste and odor or bouquet of the crystals. Moreover, the enzyme digested flour proteins have demonstrated that they can, by emulsion, entrap, imprison and preserve the characteristic tastes and odors or bouquets of the crystals and prevent their volatilization from the emulsion, even at temperatures as high as 160° F. to 170° F.

Natural pepper extractions, fresh fruit and vegetable pastes, and extractions of fenugreek and lovage, like the other flavoring agents hereinbefore specifically discussed, may be readily emulsified and protected against deterioration, loss or enfeeblement of their characteristic tastes and odors or bouquets when the enzyme-hydrolized flours of the present invention are employed as emulsifying vehicles for such flavoring agents.

The enzyme-hydrolized flours of the present invention are of very great practical value when employed to emulsify the artificial flavoring material known as butterscotch. It is very essential that butterscotch contain a substantial quantity of salt. In ordinary emulsions that salt tends quickly to deteriorate other ingredients of the butterscotch with serious resultant injury to the initial proper taste and odor of the butterscotch. The emulsifying vehicle of the present invention, in any of its varieties hereinbefore discussed, will act not only to effect a perfect emulsion of butterscotch, but will, in addition, prevent any noticeable deterioration of the butterscotch by its contained or accompanying salt. Butterscotch can be properly and satisfactorily emulsified, and its characteristic taste and odor thoroughly protected, with the enzyme-hydrolized flours of the present invention, even though the butterscotch emulsion has a salt content as high as twenty per cent to twenty-five per cent. No hitherto known solvent or flavor vehicle can satisfactorily emulsify and protect the taste and odor of butterscotch in the presence of so much salt.

The enzyme-hydrolized flours of the present invention find a very important use in imprisoning and preserving the initial characteristic tastes and aromas of natural fruit juices and concentrated fruit juices. In the prior art many attempts have been made to preserve the initial characteristic tastes of fruit juices in alcohols, and other commercial solvents, as preserving media. These attempts of the prior art never have been very successful. The fruit juices, after being in such solvents for any substantial period, always have suffered loss, enfeeblement, deterioration or objectionable modifications of the tastes and aromas which characterized them when freshly extracted from their respective fruits. When the enzyme-hydrolized flours of the present invention are added to such fruit juices, their initial fresh tastes and aromas may be kept intact, without detectible modification, for long periods of time without resorting to refrigeration.

Unless fresh fruit juices are frozen immediately after extraction from their respective fruits, they begin to lose their natural freshness (i. e., begin to suffer deterioration and enfeeblement of their natural tastes and aromas) within a very few hours. However, if such fruit juices, immediately after extraction, are emulsified with the enzyme-hydrolized flours of the present invention, they will retain their initial freshness, for weeks or even months, without refrigeration. This is true even with such fruit juices as those of orange, lemon and lime, which ordinarily deteriorate with great rapidity.

The amount of enzyme-hydrolized flour added to fresh fruit juices usually will be equal to from one per cent to ten per cent (1% to 10%) of the weight of the fruit juices. Generally speaking, the percentage of the added enzyme-hydrolized flours will depend upon the initial consistency of the fruit juices being treated and the desired consistency of the emulsified product, and the period of time the emulsified product must be kept in stock before consumption.

Fruit acids, such for examples, as citric and tartaric, may be added with no undesirable effects to fruit juices which have been emulsified with the enzyme-hydrolized flours of the present invention. Heretofore, the addition of such acids to natural, or concentrated, fresh fruit juices has very noticeably accelerated their deterioration.

Another advantage of the enzyme-hydrolized flours of the present invention resides in the fact that they may be utilized as vehicles whereby to incorporate various flavoring agents (e. g., oil of peppermint, oil of wintergreen, or the essential oils of lemon, or orange, etc.) into edible oils, e. g., purified mineral oils, cod liver oil, and various vegetable oils, without there being any necessity for adding water to such oils for emulsifying purposes. I merely add a small percentage of a selected flavoring agent to the selected enzyme-hydrolized flours, introduce the latter into the oils, and violently agitate the enzyme-hydrolized flour, flavoring agent and the oil to an emulsion.

I contemplate that the proteolysis or hydrolysis of the flours wherewith the advantages of the present invention are realized may be effected by various enzymes, e. g., pepsin and the pancreatic enzymes as well as papain and other organic vegetable ferments derived from plants or the fruits thereof.

What I claim as new and desire to secure by Letters Patent of the United States is:

1. The method of treating a flavoring agent to prevent deterioration or enfeeblement of its characteristic taste, odor or bouquet which consists in emulsifying said agent with proteolytic enzyme hydrolyzed flour.

2. A composition of matter comprising a flavoring agent emulsified with proteolytic enzyme hydrolized flour.

3. A composition of matter comprising essential oils emulsified with proteolytic enzyme hydrolized flour.

4. A composition of matter comprising vanillin emulsified with proteolytic enzyme hydrolized flour.

5. A composition of matter comprising a flavoring agent emulsified with papain hydrolized flour.

6. A composition of matter comprising butter emulsified with papain hydrolized flour.

7. A composition of matter comprising the extracted juice of a citrous fruit emulsified with papain hydrolized flour.

8. A flavoring emulsion comprising butterscotch emulsified with papain hydrolized flour.

HUGH E. ALLEN.